United States Patent [19]
Hutchins

[11] Patent Number: 5,727,729
[45] Date of Patent: Mar. 17, 1998

[54] COMBINED BYPASS AND THERMOSTAT ASSEMBLY

[75] Inventor: William Richard Hutchins, Kenilworth, England

[73] Assignee: Rover Group Limited, Warwick, England

[21] Appl. No.: 796,698

[22] Filed: Feb. 6, 1997

Related U.S. Application Data

[63] Continuation of Ser. No. 458,511, Jun. 2, 1995, abandoned.

[30] Foreign Application Priority Data

Jun. 9, 1994 [GB] United Kingdom ............ 9411617

[51] Int. Cl.[6] ........................................ F01P 7/16
[52] U.S. Cl. ........................................ 236/34.5; 123/41.1
[58] Field of Search ................ 236/34.5; 123/41.08, 123/41.09, 41.1; 165/35

[56] References Cited

U.S. PATENT DOCUMENTS

| | | | |
|---|---|---|---|
| 3,255,740 | 6/1966 | Walsh | 123/41.09 |
| 4,288,031 | 9/1981 | Hass | 236/34.5 |
| 4,425,877 | 1/1984 | Fritzenwenger et al. | 236/34.5 X |
| 4,606,302 | 8/1986 | Huemer et al. | 236/34.5 X |
| 4,644,909 | 2/1987 | Nishikata et al. | 236/34.5 X |
| 4,679,530 | 7/1987 | Kuze | 236/34.5 X |
| 5,275,231 | 1/1994 | Kuze | 236/34.5 X |

FOREIGN PATENT DOCUMENTS

| | | |
|---|---|---|
| 0 235 472 | 9/1987 | European Pat. Off. |
| A-2032092 | 11/1970 | France |
| A-1600704 | 1/1970 | Germany |
| 2 241 301 | 8/1991 | United Kingdom |

OTHER PUBLICATIONS

Patent Abstracts of Japan vol. 009 No. 067 (M-366) 27 Mar. 1985 & JP,A,59 200011 (Honda Giken Kogyo KK) 13 Nov. 1984 (abstract only).

Patent Abstracts of Japan vol. 017 No. 252 (M-1412) 15 May 1993 & JP,A,04 370318 (Hino Motors Ltd) 22 Dec. 1992 (abstract only).

*Primary Examiner*—William E. Tapolcal
*Attorney, Agent, or Firm*—Davis and Bujold

[57] ABSTRACT

A cooling circuit for an internal combustion engine is disclosed in which the bypass and thermostat assembly includes means to prevent relatively cold coolant entering the thermostat assembly from a bottom hose to impinge upon a temperature sensitive valve actuating means. The bypass and thermostat assembly is therefore unaffected by relatively colder coolant entering the assembly as the temperature sensitive part of the thermostat remains immersed in relatively warm coolant entering the assembly through a bypass hose even when the bypass is closed.

14 Claims, 5 Drawing Sheets

5,727,729

1

COMBINED BYPASS AND THERMOSTAT ASSEMBLY

This is a continuation of application Ser. No. 08/458,511 filed on Jun. 2, 1995, now abandoned.

TECHNICAL FIELD OF THE INVENTION

This invention relates to a thermostat assembly and in particular to a thermostat assembly for a cooling circuit of an internal combustion engine.

BACKGROUND OF THE INVENTION

It is well known to provide a thermostat assembly for the cooling circuit of an internal combustion engine to restrict the flow of cooling water through the radiator when the engine is started from cold.

A common problem with such assemblies is that they allow warm coolant from the bypass to flow straight out of the outlet. Another problem is that there is no control over the mixing of warm and cold coolant.

It has become increasingly popular in recent years to use a combined bypass and thermostat assembly located in the supply between the bottom of the radiator and the circulation pump rather than in the return between the engine and the top of the radiator. This change in practice has been primarily encouraged by the need to more accurately control the coolant temperature of the engine and to eliminate the large temperature oscillations which can occur when a top mounted thermostat is used.

However, it is a problem with such supply line located bypass and thermostat assemblies that they can lead to the thermostat being unduly influenced by the temperature of the relatively cold coolant entering from the bottom of the radiator. In extreme cases this can lead to the thermostat restricting the flow of cold coolant from the radiator to such an extent that boiling of the coolant within the engine occurs. It is a further problem with such prior art bypass and thermostat assemblies that the unregulated flow regime within the valve chamber can lead to inconsistent operation due to random impingement of hot fluid from the bypass or cold fluid from the radiator upon the temperature sensitive part of the thermostat.

Breeden (GB 2241301) addresses these problems by ensuring that warm coolant from the bypass must pass by the bulb of the thermostat thereby ensuring that it senses the temperature of the recirculated bypass flow. This invention has three disadvantages: firstly it utilizes all new components and so cannot be easily incorporated into an existing design, it is more expensive to produce than a conventional thermostat and thirdly it is doubtful whether the sliding seal 29 could be made to work reliably.

However, Breeden is relevant because it shows the need to produce a stable and controlled flow within the valve chamber.

It is an object of this invention to overcome the disadvantages associated with known supply line or bottom hose bypass and thermostat assemblies.

SUMMARY OF THE INVENTION

According to a first aspect of the invention there is provided a combined bypass and thermostat assembly for a cooling circuit of an internal combustion engine comprising a housing defining a valve chamber and a bypass and thermostat valve assembly mounted in the valve chamber, the housing having a first fluid inlet to connect the valve chamber to a source of cooled fluid, a second fluid inlet to connect the valve chamber to a bypass flow from the engine and a fluid outlet to connect the valve chamber to a return supply to the engine, the bypass and thermostat valve assembly having a temperature responsive valve actuating means connected to a first valve member to regulate the flow of fluid from the first inlet to the outlet in response to the sensed temperature of the fluid in contact with a temperature sensitive part of the temperature responsive valve actuating means and a second valve member to regulate the flow of fluid from the second inlet to the outlet wherein flow control means are attached to part of the wall of the valve chamber to direct the fluid entering the housing through the second inlet over the temperature sensitive portion of the temperature responsive valve actuating means so that the position of the first valve member is determined primarily by the temperature of the fluid entering the valve chamber through the second fluid inlet.

Preferably, the flow control means may include a tube connected to the second inlet to form an inner valve chamber encircling the temperature sensitive portion of the temperature responsive valve actuating means.

Advantageously, the first valve member is plate like and acts so as to deflect flow from the first inlet away from the temperature sensitive portion of the temperature responsive valve actuating means.

The first valve member may be attached to the temperature sensitive portion of the temperature responsive valve actuating means so that between 10% and 20% of the outer surface area of the temperature sensitive portion is exposed to fluid entering through the first inlet.

The temperature sensitive portion may be a wax filled temperature responsive actuator.

The housing may comprise of two separate housing parts connected together to define the valve chamber.

The tube may be formed as an integral part of one of the two housing parts.

According to a second aspect of the invention there is provided a cooling circuit for an internal combustion engine comprising a radiator having a top tank and a bottom tank a supply line between the bottom tank and the engine, a combined bypass and thermostat assembly interposed in the supply line, a coolant circulation pump to circulate coolant through the engine and return it via a return line to the top tank and a bypass line connected between the return line and the combined bypass and thermostat assembly to allow a controlled flow of coolant from the return line to pass back into the engine wherein the bypass and thermostat assembly comprises a housing defining a valve chamber and a bypass and thermostat valve assembly mounted in the valve chamber, the housing having a first fluid inlet to connect the valve chamber to the supply line from the bottom tank, a second fluid inlet to connect the valve chamber to the bypass line and a fluid outlet to connect the valve chamber to the supply line to the engine, the bypass and thermostat valve assembly having a temperature responsive valve actuating means connected to a first valve member to regulate the flow of fluid from the first inlet to the outlet in response to the sensed temperature of the fluid in contact with a temperature sensitive portion of the temperature responsive valve actuating means and a second valve member to regulate the flow of fluid from the second inlet to the outlet, the flow control means being attached to part of the wall of the valve chamber to direct the fluid entering the housing through the second inlet over the temperature sensitive portion of the temperature responsive valve actuating means so that the position of the first valve member is determined primarily by the temperature of the fluid entering the valve chamber through the second fluid inlet from the bypass line.

Preferably, the flow control means may include a tube connected to the second inlet to form an inner valve chamber encircling the temperature sensitive portion of the temperature responsive valve actuating means.

Advantageously, the first valve member is plate like and acts so as to deflect flow from the first inlet away from the temperature sensitive portion of the temperature responsive valve actuating means. The first valve member may be attached to the temperature sensitive portion of the temperature responsive valve actuating means so that between 10% and 20% of the outer surface area of the temperature sensitive portion is exposed to fluid entering through the first inlet.

The temperature sensitive portion may be a wax filled temperature responsive actuator.

The housing may comprise of two separate housing parts connected together to define the valve chamber.

The tube may be formed as an integral part of one of the two housing members.

The outlet from the bypass and the thermostat assembly may be connected to the inlet side of the coolant circulation pump.

The attractiveness of the present invention is that the majority of the parts are completely standard and so have been used for many years. The implementation of the invention therefore only requires a small change to standard parts in order to be made. Although the terms hot and cold are used it will be appreciated that when the engine is up to normal operating temperature there may be very little difference between the temperature of the coolant in the bypass and that from the radiator. It would appear that provided the cold coolant cannot disturb the fluid surrounding temperature sensitive element and there is sufficient warm coolant surrounding the temperature sensitive portion of the invention is enabled. It is therefore possible that the tube could have apertures in it.

BRIEF DESCRIPTION OF THE DRAWINGS

The invention will now be described with reference to the accompanying drawings of which.

DETAILED DESCRIPTION OF THE INVENTION

Figure 5:
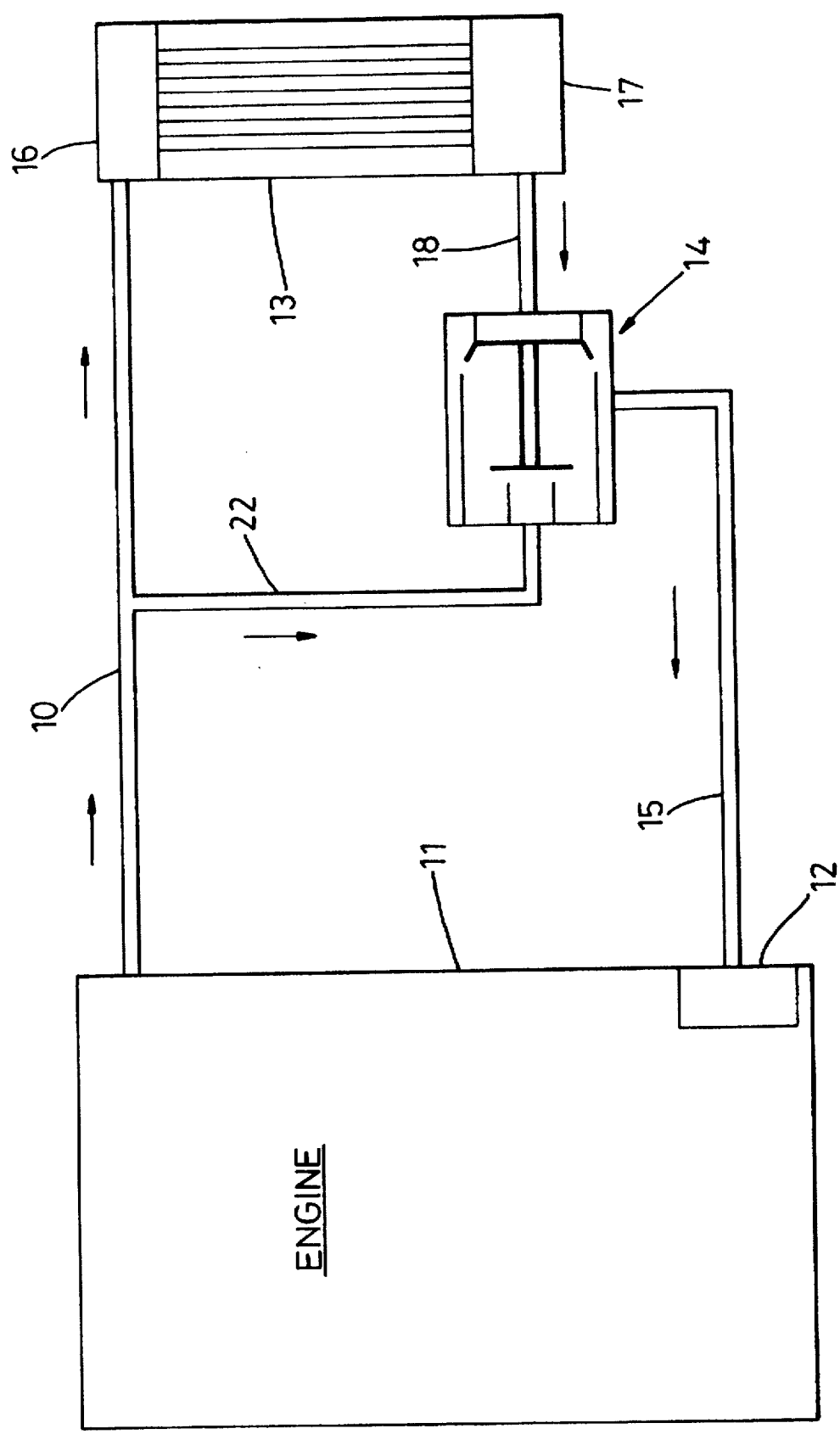
FIG. 5 is a schematic drawing of a cooling circuit for an internal combustion engine incorporating a combined bypass and thermostat according to the first embodiment of the invention.

With reference to FIG. 5 there is shown an engine 11 having a coolant circulation pump 12, a radiator 13 having a top tank 16 and a bottom tank 17 and a combined bypass and thermostat assembly 14 interposed in the supply line between the bottom tank 17 and the coolant circulation pump 12.

The bypass and thermostat assembly 14 is connected to the bottom tank 17 of the radiator 13 by means of a bottom hose 18 and to the circulation pump 12 by means of a supply hose 15. The bypass and thermostat assembly is connected to a top or return hose 10 connecting the engine 11 to the top tank 16 of the radiator 13 by means of a bypass hose 22.

In use, the cooling circuit operates as follows, initially, when the engine is cold, the thermostat part of the assembly 14 is in a closed position preventing the passage of coolant from the bottom tank 17 into the engine 11 via the bottom hose 18 and the supply hose 15.

To prevent local overheating of the engine 11 when the thermostat valve is closed the bypass valve part of the assembly is open allowing a controlled flow of coolant from the return hose 10 through the bypass passage 22 to the supply hose 15.

When the temperature of the coolant passing through the bypass and thermostat assembly 14 reaches a predetermined temperature the thermostat part of the assembly 14 is operative to allow coolant to gradually be admitted from the bottom tank 17 through the bottom hose 18 to mix with the coolant already circulating through the engine 11.

When the engine is at its normal running temperature, coolant passes freely from the bottom tank 17 through the bypass and thermostat assembly 14 and into the circulation pump 12, through cooling passages (not shown) defined within the engine 11 and then back to the top tank 16 via the return hose 10 to be cooled for recirculation from the bottom tank 17.

As the temperature of the coolant approaches the normal running temperature the bypass valve part of the assembly closes so that flow through the bypass hose 22 is effectively shut off ensuring that virtually all of the coolant circulates through the radiator 13 before returning to the engine 11.

Figure 1:
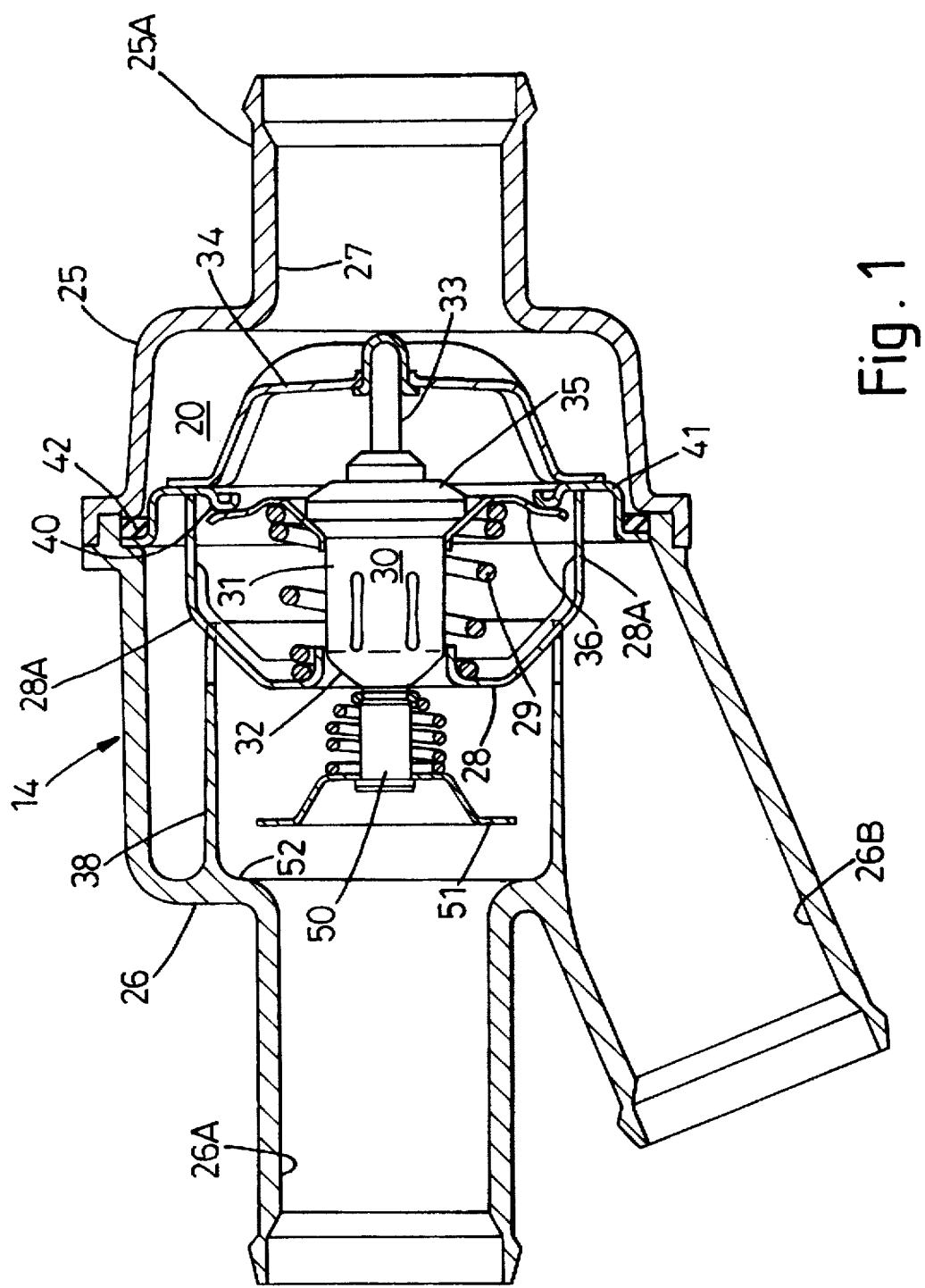
FIG. 1 is a cross section through a combined bypass and thermostat assembly according to a first embodiment of the invention showing the thermostat valve in a closed position with the bypass valve fully open.
Figure 2:
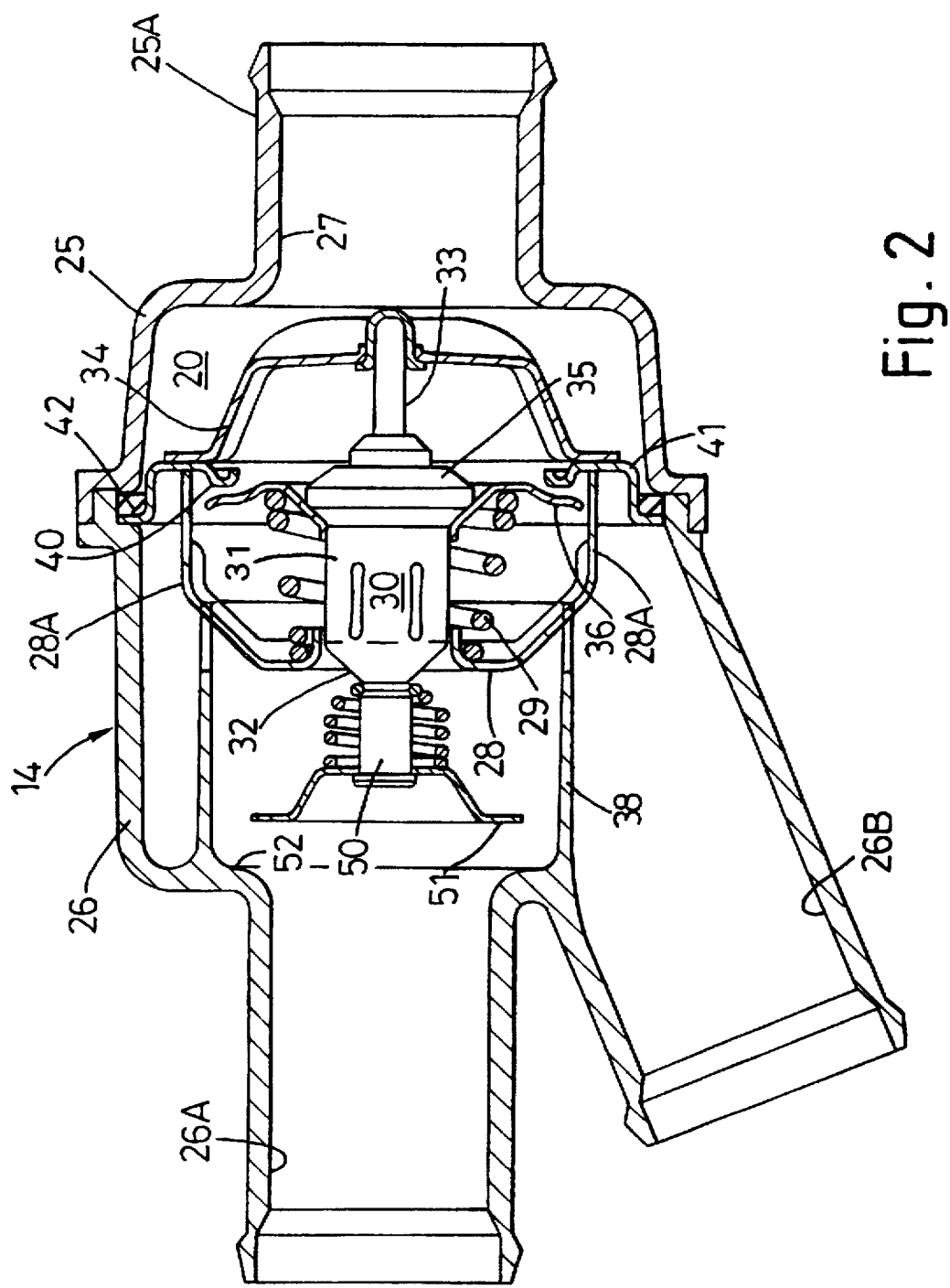
FIG. 2 is a cross section similar to that of FIG. 1 but showing the thermostat valve partially open.

With particular reference to FIGS. 1 and 2 there is shown in greater detail the combined bypass and thermostat assembly 14.

The assembly comprises first and second plastic housings 25, 26 secured together by friction welding defining a valve chamber 20 in which is mounted a combined bypass and thermostat valve assembly 30.

The first plastic housing 25 has the form of a tubular inlet member, a cylindrical outer surface 25A for engagement with the bottom hose 18, and an internal surface which defines a first inlet passage 27 and part of the valve chamber 20.

The second plastic housing 26 has an internal cavity which defines the major portion of the valve chamber 20, a first cylindrical portion defining a second inlet passage 26A to connect the bypass hose 22 to the valve chamber 20 and a second cylindrical portion defining an outlet passage 26B to connect the valve chamber 20 to the supply hose 15. The first and second inlet passages 27, 26A are on a common axis whereas the axis of the outlet means 26B is inclined with respect to the common axis of the first and second inlet passages 27, 26A.

The bypass and thermostat valve assembly 30 is conventional in construction and comprises a temperature responsive valve actuating means 31 formed by a temperature sensitive wax filled body 32, an end cap 35 and a reaction rod 33. The reaction rod 33 extends away from the wax filled body 32 towards the first inlet passage 27 where it abuts against an end plate 34 of the valve assembly 30.

A first valve member 36 is attached to the end cap 35 and the wax filled body 32 near to the end from which extends the reaction rod 33. The first valve member 36 extends radially outwardly from the wax filled body 32 for co-operation with an inwardly extending lip 40 formed on a flange plate 41 connected to the end plate 34. The first valve member 36 and the extending lip 40 form, in combination, the thermostat valve part of the valve assembly 30 to regulate the flow of coolant from the first inlet passage 27 to the outlet passage 26B.

The first valve member 36 is biased towards the lip 40 against the action of the valve actuating means 31 by a spring 29 interposed between the first valve member 36 and a reaction plate 28 connected to the end plate 34 by means of a pair of longitudinally extending limbs 28A.

The flange plate 41 is used to support and locate the valve assembly 30 within the valve chamber 20 and is clamped around its outer periphery between the first and second housings 25, 26. A sealing ring 42 is interposed between the first housing 25 and the flange plate 41 to provide a seal between the first and second housings 25, 26.

At the end of the bypass and thermostat valve assembly 30 facing the second inlet passage 26A there is formed a spring biased second valve means in the form of a bypass flow valve 50. The bypass flow valve 50 has a valve member 51 for abutment against an end wall 52 of the second plastic housing 26 to regulate the flow of coolant from the second inlet 26A to the outlet passage 26B.

A tube 38 attached to the end wall 52 of the second housing member 26 extends away from the second inlet means 26A to define a cylindrical inner chamber encircling the majority of the wax filled body 32 of the bypass and thermostat valve assembly 30.

The tube 38 prevents coolant from flowing directly from the second inlet means 26A to the outlet means 26B without passing over the wax filled body 32. This ensures that the wax filled body 32 is primarily influenced by the temperature of the coolant within the inner chamber formed by the tube 38 and not by the temperature of the coolant entering through the first inlet passage 27.

The first valve member 36 deflects coolant entering the thermostat assembly through the first inlet passage 27 outwardly and way from the temperature sensitive wax filled body 32 which, in combination with the tube 38, ensures that it is very difficult for cold coolant entering through the first inlet passage 27 to impinge directly upon the main part of the wax filled body 32.

To further shield the wax filled body 32 from the cold coolant entering the bypass and thermostat assembly 14 through the first inlet 27 a small flow of relatively hot coolant is allowed to reach the wax filled body 32 even when the valve member 51 is in abutment with the end wall 52.

When the engine 11, shown in FIG. 5, has reached its normal running temperature the reaction rod 33 is virtually fully extended causing the first valve member 36 to be fully open and the bypass flow valve 50 is closed thereby restricting the flow of coolant passing between the second inlet 26A and the outlet 26B. The closing of the bypass valve 50 ensures that the majority of the coolant passes through the radiator before being returned to the engine thereby achieving maximum cooling.

Figure 3:
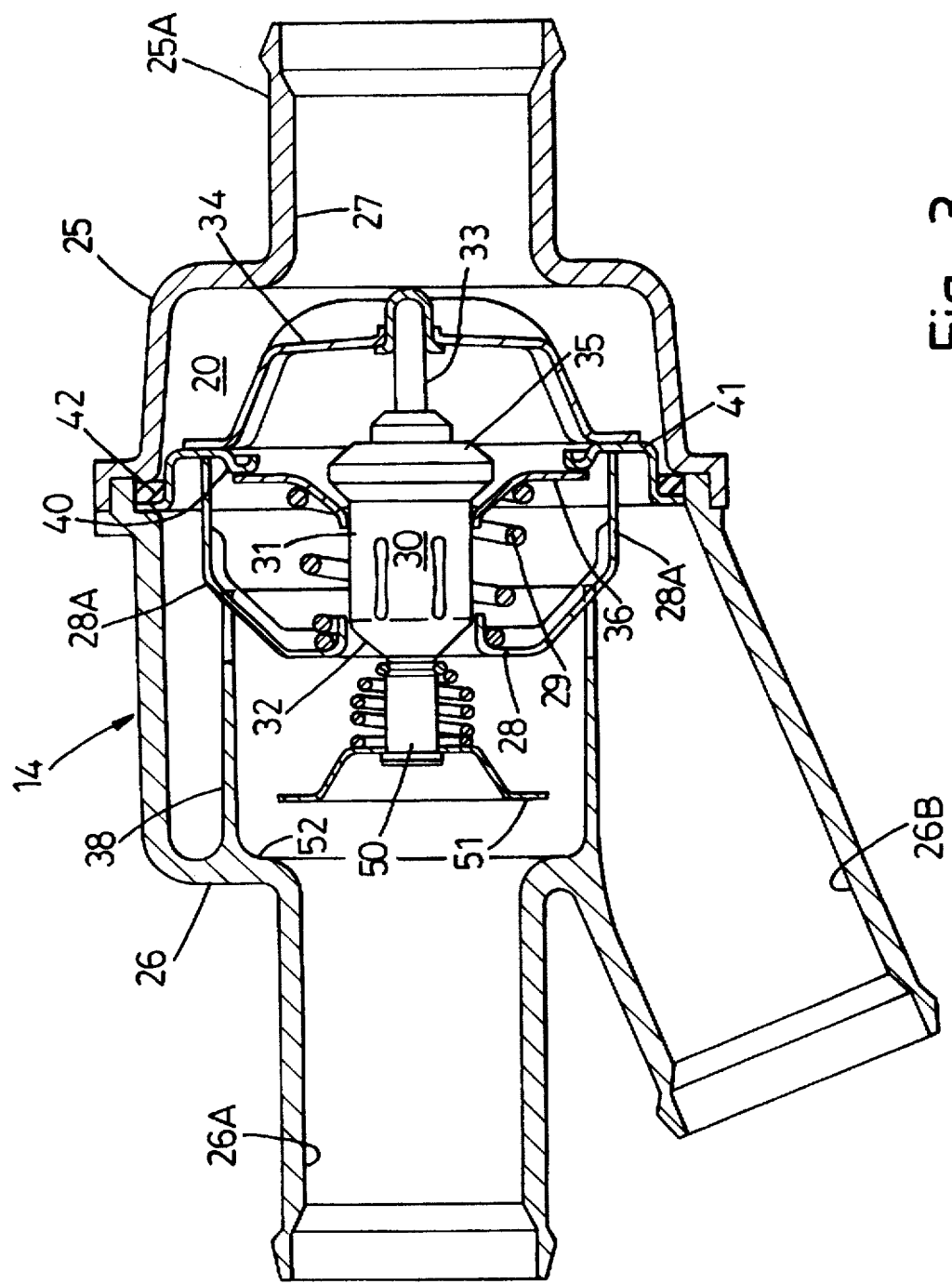
FIG. 3 is a cross section similar to that of FIG. 1 but showing a first modification.

With reference to FIG. 3 there is shown a combined bypass and thermostat assembly which is in most respects identical to that shown in FIG. 1 with the exception that the first valve means 36 is attached to the outer surface of the wax filled body 32 further along the wax filled body 32 towards the bypass valve 50. This modification allows between 10% and 20% of the outer surface of the wax filled body 32 to be exposed to the flow from the first inlet passage 27.

This modification prevents the thermostat from opening too soon when the ambient temperature of the coolant from the radiator is very low thereby allowing the engine to attain a higher temperature before relatively cold coolant is admitted from the radiator.

Figure 4:
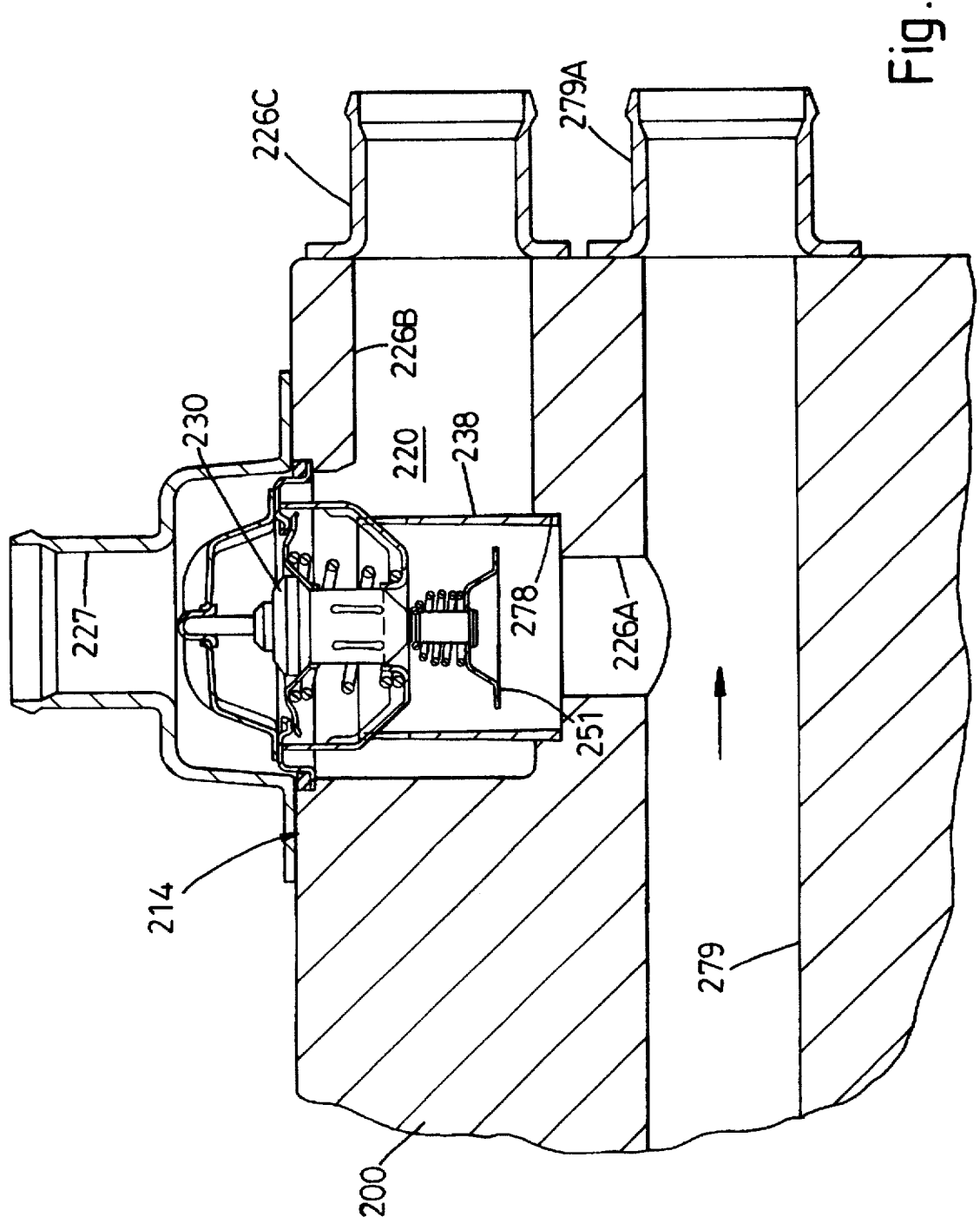
FIG. 4 is a cross section through a combined bypass and thermostat assembly according to a second embodiment of the invention showing the thermostat valve in a closed position and the bypass valve in an open condition.

With reference to FIG. 4 there is shown a second embodiment of the invention in which the first plastic housing is substantially as described above but in which the second plastic housing is replaced by a number of cavities and passageways formed as an integral part of the cylinder head or cylinder block of the engine.

The bypass and thermostat assembly 214 is in most respects identical to that previously described and also utilizes a conventional bypass and thermostat valve assembly 230 located in a valve chamber 220. However, instead of the tube 238 which forms the inner valve chamber being formed as an integral part of one of the housings it is in this case a separate component that is press fitted into a bore 278 in the cylinder head 200 which defines part of the valve chamber 220.

In use, coolant will enter the valve chamber 220 from the first inlet 227 which is connected to the radiator, or from the second inlet 226A, depending on the operating conditions. In either case the coolant returns via the outlet passage 226B to the coolant circulation pump via a hose (not shown) connected to the pipe connector 226C.

If the bypass valve 251 is closed the majority of coolant from the engine passing along the passageway 279 which is connected to other passageways (not shown) will go directly back to the radiator via a hose (not shown) connected to the pipe connector 279A.

Although the invention has been described by way of example with reference to a water cooling circuit for an internal combustion engine it will be appreciated that it could be similarly used in an oil cooling circuit for an internal combustion engine or other fluid cooling systems.

Furthermore it will be appreciated that the invention is not limited to the embodiments specifically described herein, for example, the first and second housings could be made of any suitable material, and the bypass and thermostat assembly could be incorporated into the housing of another component forming part of the cooling circuit such as the circulation part of the radiator.

It will also be appreciated that the tube which forms the inner valve chamber could be formed as an integral part of the housing as described with respect to the first embodiment or could be a separate component as described with respect to the second embodiment.

Wherefore, what is claimed is:

1. A combined bypass and thermostat assembly, for a cooling circuit of an internal combustion engine, comprising:

a housing defining a valve chamber;

a bypass and thermostat valve assembly being mounted in said valve chamber;

a first fluid inlet being provided in said housing for connecting said valve chamber to a source of cooled fluid;

a second fluid inlet being provided in said housing for connecting said valve chamber to a flow of bypass fluid from said engine;

a fluid outlet being provided in said housing for facilitating a return of said fluid to said engine;

said bypass and thermostat valve assembly having a temperature responsive valve actuating means being connected to a first valve member to regulate a flow of cooled fluid from said first fluid inlet to said fluid outlet in response to a sensed temperature of fluid in contact with a temperature sensitive portion of said temperature responsive valve actuating means and a second valve member for regulating the flow of said bypass fluid from said second fluid inlet to said fluid outlet, said first valve member extending radially outwardly from said temperature responsive valve actuating means and being arranged so as to deflect any fluid entering toward said thermostat assembly, through said first inlet passage, outwardly and away from said temperature sensitive portion of said temperature responsive valve actuating means;

wherein a tube is attached to part to a wall of said valve chamber to direct said bypass fluid entering said valve chamber, through said second fluid inlet, by said temperature sensitive portion of said temperature responsive valve actuating means and said tube is connected to said second fluid inlet to form an inner valve chamber encircling and at least partially housing said temperature sensitive portion of said temperature responsive valve actuating means, such that at least while the second valve member is open, said temperature sensitive portion primarily communicates with said bypass fluid from said second fluid inlet and is sufficiently shielded from any flow of cooled fluid entering said housing through said first fluid inlet, so that a position of said first valve member is determined primarily by a temperature of the fluid entering said valve chamber through said second fluid inlet at least while the second valve member is in an open position.

2. A combined bypass and thermostat assembly as claimed in claim 1 wherein said first valve member is plate-like and acts so as to deflect said cooled fluid from said first fluid inlet away from said temperature sensitive portion of said temperature responsive valve actuating means.

3. A combined bypass and thermostat assembly as claimed in claim 1 wherein said first valve member is attached to said temperature sensitive portion of said temperature responsive valve actuating means so that between 10% to 20% of an outer surface area of said temperature sensitive portion is exposed to said cooled fluid entering through said first fluid inlet.

4. A combined bypass and thermostat assembly as claimed in claim 1 wherein said temperature sensitive portion is a wax filled temperature responsive actuator.

5. A combined bypass and thermostat assembly as claimed in claim 1 wherein said housing is comprised of two separate housing parts connected together to define said valve chamber.

6. A combined pass and thermostat assembly as claimed in claim 5 wherein said flow control means includes a tube connected to said second fluid inlet to form an inner valve chamber encircling said temperature sensitive portion of said temperature responsive valve actuating means; and said tube is formed as an integral part of one of said two housing parts.

7. A cooling circuit for an internal combustion engine comprising:

a radiator having a first portion of a tank and a second portion of a tank;

a supply line being connected between said second portion of said tank and said engine;

a combined bypass and thermostat assembly being interposed in said supply line;

a return line being connected between said engine and said first portion of said tank; a fluid circulation pump being connected in said cooling circuit to circulate fluid through said engine and return said fluid, via said return line, to said first portion of said tank; and a bypass line being connected between said return line and said combined bypass and thermostat assembly for allowing a controlled flow of said fluid from said return line to flow back into said engine;

said combined bypass and thermostat assembly comprising a housing defining a valve chamber, said housing having a first fluid inlet connecting said valve chamber to said supply line from said second portion of said tank, a second fluid inlet connecting said valve chamber to said bypass line, and a fluid outlet connecting said valve chamber to said supply line to said engine;

a bypass and thermostat valve assembly being mounted in said valve chamber, said bypass and thermostat valve assembly having temperature responsive valve actuating means controlling a first valve member and a second valve member;

said first valve member regulating a flow of a cooled fluid from said first fluid inlet to said fluid outlet in response to a sensed temperature of a bypass fluid contacting a temperature sensitive portion of said temperature responsive valve actuating means;

said second valve member regulating a flow of said bypass fluid from said second fluid inlet to said fluid outlet;

wherein a tube forms a portion of a wall partially defining said valve chamber, said tube is connected to said second fluid inlet and extends into said valve chamber to define an inner valve chamber encircling and at least partially housing said temperature sensitive portion of said temperature responsive valve actuating means such that said tube, at least while the second valve member is in an open position, directs said bypass fluid entering said valve chamber into contact with said temperature sensitive portion of said temperature responsive valve actuating means whereby, at least while the second valve member is in the open position, said temperature sensitive portion primarily communicates with said bypass fluid of said second inlet and is sufficiently shielded from cooled fluid entering said valve chamber, via said first fluid inlet, so that the position of said first valve member is determined primarily by a temperature of said bypass fluid entering said valve chamber via said second fluid inlet.

8. A cooling circuit as claimed in claim 7 wherein said first valve member is plate like and acts so as to deflect said cooled fluid from said first fluid inlet away from said temperature sensitive portion of said temperature responsive valve actuating means.

9. A cooling circuit as claimed in claim 7 wherein said first valve member is attached to said temperature sensitive portion of said temperature responsive valve actuating means so that between 10% and 20% of an outer surface area of said temperature sensitive portion is exposed to said cooled fluid entering through said first fluid inlet.

10. A cooling circuit as claimed in claim 7 wherein said temperature sensitive portion is a wax filled temperature responsive actuator.

11. A cooling circuit as claimed in claim 7 wherein said housing comprises two separate housing parts connected together to define said valve chamber.

12. A cooling circuit as claimed in claim 11 wherein said flow control means includes a tube connected to said second fluid inlet to form an inner valve chamber encircling said temperature sensitive portion of said temperature responsive valve actuating means; and said tube is formed as an integral part of one of said two housing parts.

13. A combined bypass and thermostat assembly as claimed in claim 7 wherein said flow control means includes a tube connected to said second fluid inlet to form an inner valve chamber encircling said temperature sensitive portion of said temperature responsive valve actuating means and said second valve member allows a relatively small flow of bypass fluid to continue flowing past said second valve member even when said second bypass valve is closed.

14. A combined bypass and thermostat assembly, for a cooling circuit of an internal combustion engine, comprising:

a housing defining a valve chamber;

a bypass and thermostat valve assembly being mounted in said valve chamber;

a first fluid inlet being provided in said housing for connecting said valve chamber to a source of cooled fluid;

a second fluid inlet being provided in said housing for connecting said valve chamber to a flow of bypass fluid from said engine;

a fluid outlet being provided in said housing for facilitating a return of said fluid to said engine;

said bypass and thermostat valve assembly having temperature responsive valve actuating means with a temperature sensitive portion, and said temperature responsive valve actuating means controlling a position of a first valve member and a second valve member;

said first valve member extending radially outwardly from said temperature responsive valve actuating means and being arranged such that any cooled fluid, entering said valve chamber from said first fluid inlet, is deflected outwardly and away from said temperature sensitive portion of said temperature responsive valve actuating means by said first valve member;

said second valve member controlling flow of said bypass fluid from said second fluid inlet into said valve chamber;

wherein a tube forms a portion of a wall partially defining said valve chamber, said tube is connected to said second fluid inlet and extends into said valve chamber to define an inner valve chamber encircling and at least partially housing said temperature sensitive portion of said temperature responsive valve actuating means such that said tube, at least while the second valve member is in an open position, directs said bypass fluid entering said valve chamber into contact with said temperature sensitive portion of said temperature responsive valve actuating means whereby, at least while the second valve member is in the open position, said temperature sensitive portion primarily communicates with said bypass fluid of said second inlet and is sufficiently shielded from cooled fluid entering said valve chamber, via said first fluid inlet, so that the position of said first valve member is determined primarily by a temperature of said bypass fluid entering said valve chamber via said second fluid inlet.

* * * * *